(12) United States Patent
Finnigan

(10) Patent No.: US 7,221,745 B2
(45) Date of Patent: May 22, 2007

(54) TELEPHONIC VOICE MESSAGE TRANSMISSION CONTROL METHOD

(75) Inventor: Paul F. Finnigan, Los Gatos, CA (US)

(73) Assignee: WorldVoice Licensing, Inc., Washington, DC (US)

(*) Notice: Subject to any disclaimer, the term of this patent is extended or adjusted under 35 U.S.C. 154(b) by 245 days.

(21) Appl. No.: 10/868,819

(22) Filed: Jun. 17, 2004

(65) Prior Publication Data

US 2005/0025297 A1   Feb. 3, 2005

Related U.S. Application Data

(60) Continuation of application No. 10/656,162, filed on Sep. 8, 2003, which is a continuation of application No. 09/756,693, filed on Jan. 9, 2001, now Pat. No. 6,697,459, which is a division of application No. 08/817,443, filed on Aug. 22, 1997, now Pat. No. 6,173,043, which is a continuation-in-part of application No. 08/684,318, filed on Jul. 18, 1996, now Pat. No. 5,687,220, which is a continuation of application No. 08/332,102, filed on Oct. 31, 1994, now abandoned.

(30) Foreign Application Priority Data

Oct. 31, 1995   (WO) .................. PCT/US95/14204

(51) Int. Cl.
*H04M 1/64* (2006.01)

(52) U.S. Cl. ............. 379/88.23; 379/88.18; 379/211.02

(58) Field of Classification Search ............. 379/88.23, 379/88.12, 211.02
See application file for complete search history.

(56) References Cited

U.S. PATENT DOCUMENTS

| | | | |
|---|---|---|---|
| 5,276,731 A * | 1/1994 | Arbel et al. ........... | 379/211.02 |
| 5,329,578 A | 7/1994 | Brennan et al. | |
| 5,422,936 A | 6/1995 | Atwell | |
| 5,909,483 A * | 6/1999 | Weare et al. ........... | 379/88.18 |

FOREIGN PATENT DOCUMENTS

| | | |
|---|---|---|
| EP | 0 485 980 | 5/1992 |
| EP | 0 560 111 | 9/1993 |
| EP | 0 588 101 | 3/1994 |

* cited by examiner

*Primary Examiner*—Gerald Gauthier
(74) *Attorney, Agent, or Firm*—McKenna Long & Aldridge LLP

(57) ABSTRACT

The present invention is directed to a method of controlling transmission of voice messages or information via telephonic voice message systems, which are sometimes referred to as Voice Mail Systems. Users of the system selectively specify voice message transmission instructions for controlling transmission of voice messages directed to them. Upon receipt of a user's voice message address, the voice message system determines whether the destination voice message address has a specified voice message transmission instruction previously selected by the recipient and processes the voice message in accordance with the instruction.

27 Claims, 3 Drawing Sheets

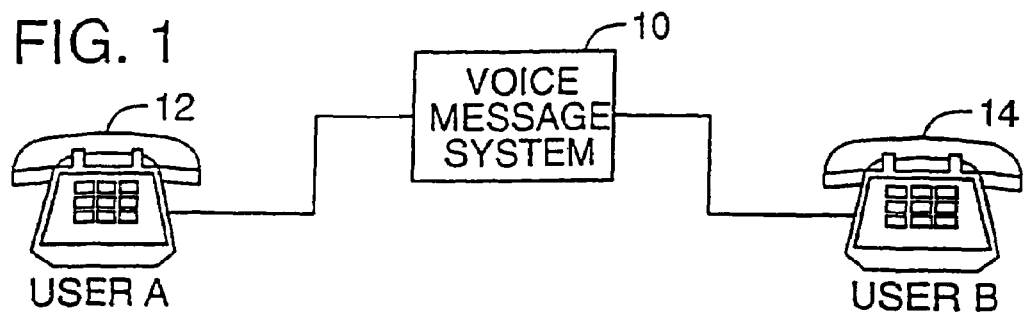
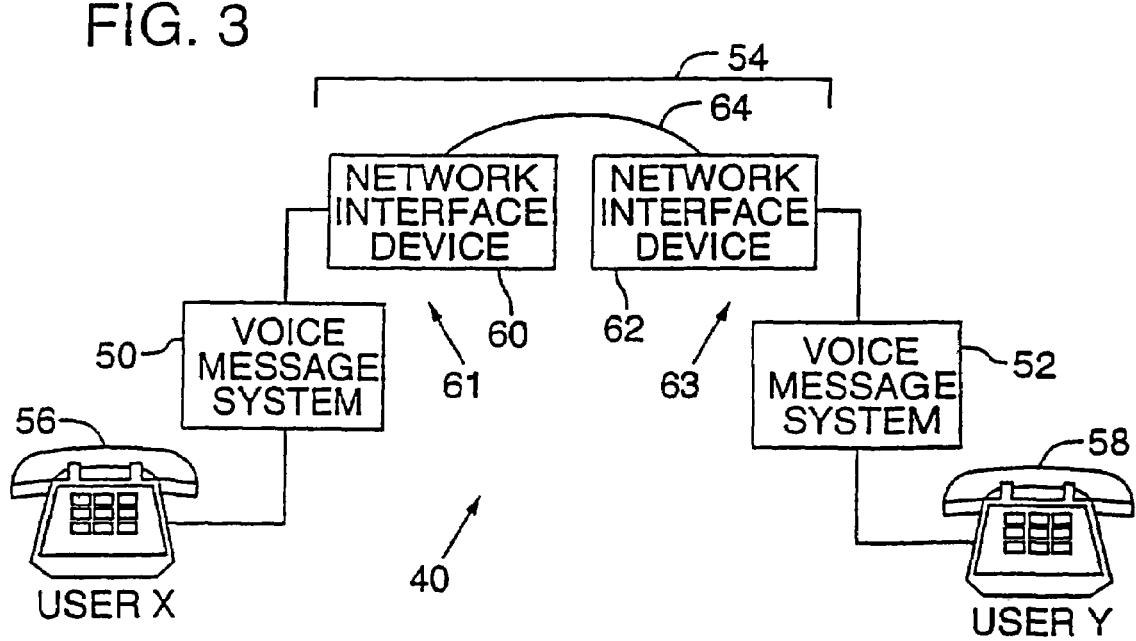

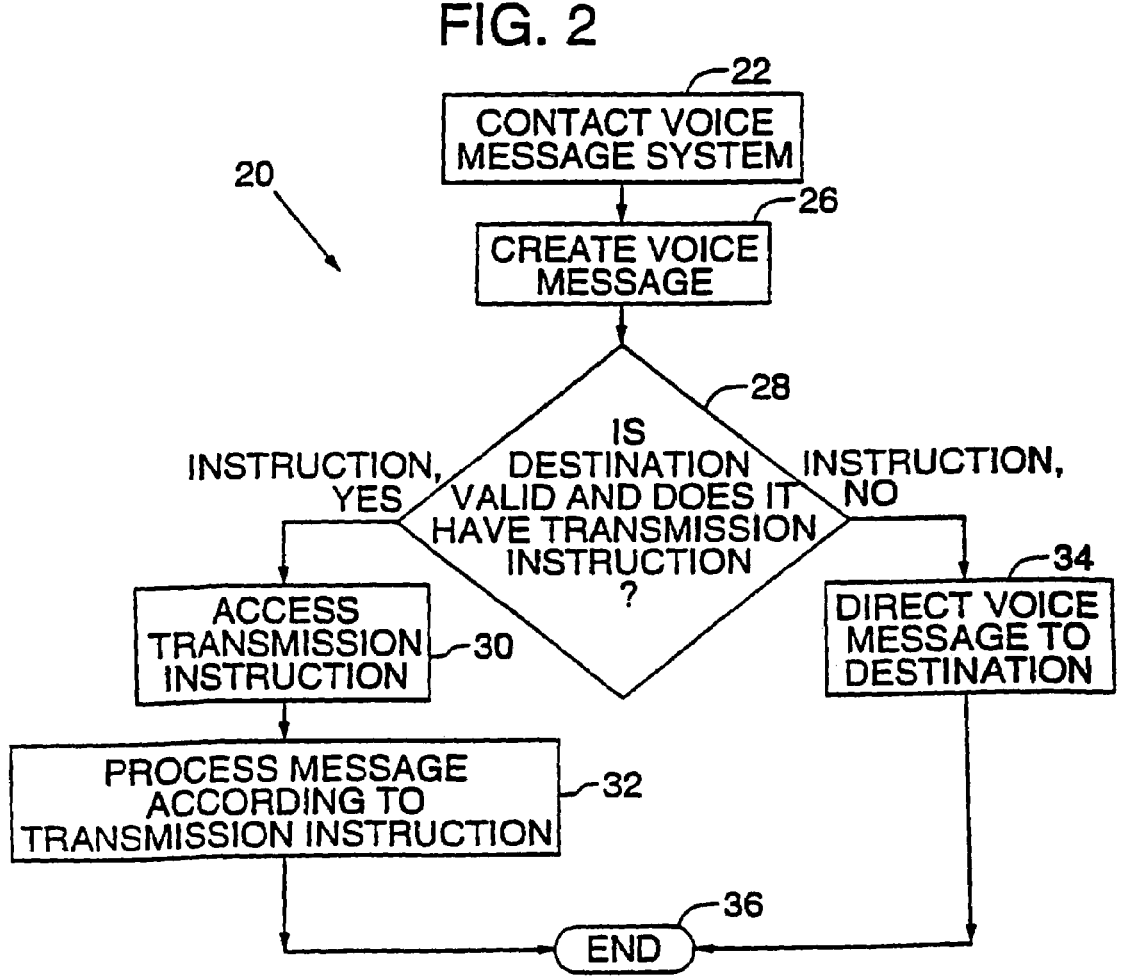

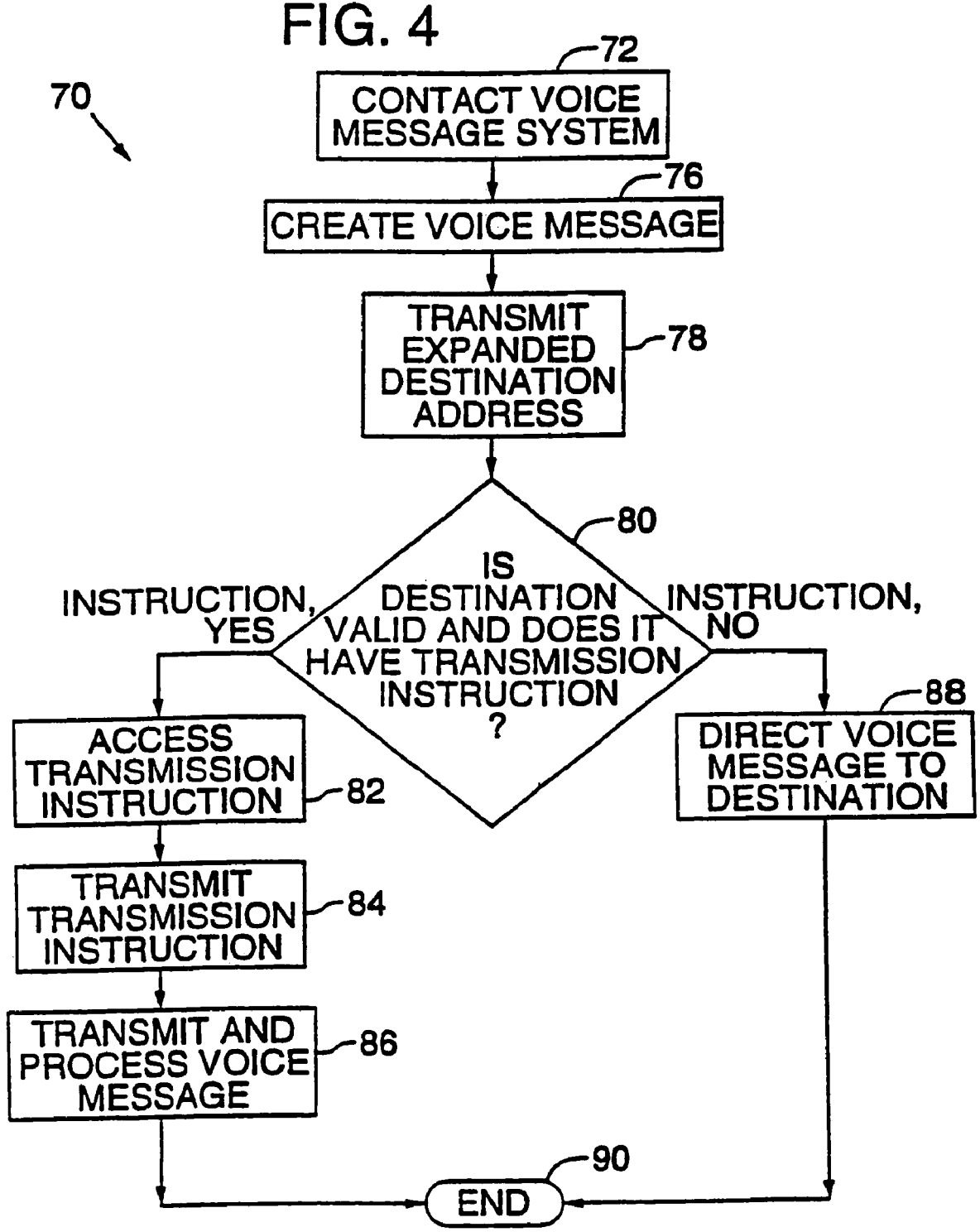

TELEPHONIC VOICE MESSAGE TRANSMISSION CONTROL METHOD

CROSS-REFERENCE TO RELATED APPLICATIONS

This application is a continuation of prior application Ser. No. 10/656,162, filed Sep. 8, 2003, which is a continuation of prior application Ser. No. 09/756,693, filed Jan. 9, 2001, now U.S. Pat. No. 6.697.459, which is a prior divisional of application Ser. No. 08/817,443, filed Aug. 22, 1997, now U.S. Pat. No. 6,173,043, which is a prior continuation-in-part of application Ser. No. 08/684.318, filed Jul. 18, 1996, now U.S. Pat. No. 5,687,220, which is a prior continuation of application Ser. No. 08/332,102, filed Oct. 31, 1994, abandoned, which is incorporated herein by reference in its entirety.

TECHNICAL FIELD

The present invention relates to telephonic voice message systems, sometimes referred to as Voice Mail systems and, in particular, to a method of controlling transmission of telephonic voice message data in such systems.

BACKGROUND OF THE INVENTION

Electronic interpersonal communication may be conducted in a variety of formats including direct telephonic voice communication, facsimile document communication, electronic mail communication, and telephonic voice message communication. Facsimile document communication and electronic mail communication may be characterized as document-based, and the other two formats as voice-based.

Direct telephonic voice communication is unique among these formats in that it requires contemporaneous participation by all parties. In many business situations, the requirement for contemporaneous participation is unnecessary, disruptive, and time consuming. As a consequence, the noncontemporaneous communication formats of facsimile document communication, electronic mail communication, and telephonic voice message communication are becoming preferred over direct telephonic voice communication for many situations.

With increasing volumes of information being transmitted by the different noncontemporaneous communication formats, recipients of the information can be burdened by the effort of sorting through and reviewing the information. In this regard, the document basis of facsimile and electronic mail communication formats allow a recipient to visually sort through large amounts of information relatively quickly.

In contrast, voice-based information or messages on telephonic voice message systems are reviewed aurally, which requires that the recipient review telephonic voice messages serially. With increasing numbers of telephonic voice messages, the review of messages by a recipient can become excessively time-consuming and burdensome.

This burden can be exacerbated because conventional telephonic voice message systems provide the recipient with little control over which information is received over the system. In contrast, some conventional communication systems other than telephonic voice message systems provide the recipient of the information with at least minor control over the information received. For example, some direct telephonic communication systems include features such as call forwarding. Some electronic mail systems include message notification prioritization based on the identity of the sending party.

EP-A-0 588 101 discloses a message storage and retrieval system employing selected caller processing which uses automatic number identification (ANI) to implement several voice message instruction features such as message forwarding, message priority, customized greetings and single digit call-back to the voice message originator. The instructions are executed on voice messages that have already been transmitted and stored by a sender in the recipient's voice message system.

SUMMARY OF THE INVENTION

An object of the present invention is, therefore, to provide a method of controlling transmission of telephonic voice message information.

Another object of this invention is to provide such a method in which the recipient controls the telephonic voice message data to be received.

A further object of this invention is to provide such a method in which the telephonic voice message data to be received is controlled according to the voice message system address of the sender.

The present invention is directed to a method of controlling transmission of voice messages or information via telephonic voice message systems. In a preferred embodiment, a person speaks into a telephone to create or originate a voice message to he sent to another person. The recipient of the message has an assigned address or "mailbox" on the telephonic voice message system analogous to a telephone number and referred to as the destination voice message address. The sender may have an assigned address on and be a system user of the voice message system or may be a system visitor without a permanent system address and who, for example, accesses the system after an unsuccessful direct telephone call to the recipient.

After the sender has originated the voice message, the sender directs the voice message to the recipient by sending the voice message and the destination address to the telephonic voice message system. In many systems, the originator keys the destination address number into a DTMF telephone keypad. Other voice message systems include voice recognition subsystems that allow the originator to enter the destination address merely by stating it. Upon receipt of the voice message and the destination address, the telephonic voice message system determines whether the destination voice message address is valid and whether it has a specified voice message transmission instruction previously selected by the recipient for controlling voice messages directed to the destination address.

Preferably, a variety of voice message transmission instructions can be selected by the recipient. The selectable voice message transmission instructions can include, for example, transmitting the telephonic voice message data to an alternate or additional voice message destination having a voice message address different from the destination voice message address, determining whether the origination address is included in a list of at least one acceptable origin address and transmitting the voice message to the destination only if the origination address is included in the preselected set, or determining whether the origination address is included in a list of at least one unacceptable origin address and blocking transmission of the voice message to the destination address whenever the origination address is included in the list.

The selectable voice message transmission instructions also can include assigning voice messages from a specified origination address with a delivery priority (e.g., high or low) that determines the sequence in which messages are retrieved by the recipient, or designating voice messages from a specified origination address as being private so the messages cannot be copied or forwarded. If the voice message system includes a voice recognition and conversion subsystem, the selectable voice message transmission instructions can include converting voice messages to electronic mail or facsimile documents and delivering them to a selected electronic mailbox or facsimile device, respectively.

Whenever the destination address has a specified voice message transmission instruction for controlling transmission of the telephonic voice message data, the voice message system processes the voice message according to the instruction. Whenever the destination address has no specified voice message transmission instruction for controlling transmission of the telephonic voice message data, the voice message is transmitted to the destination address and stored for retrieval by the recipient, as in conventional operation of voice message systems.

Additional objects and advantages of this invention will be apparent from the following detailed description of preferred embodiments thereof which proceeds with reference to the accompanying drawings.

BRIEF DESCRIPTION OF THE DRAWINGS

FIG. 1 is a simplified schematic block diagram of a telephonic voice message system in which voice message transmission is controllable according to the method of the present invention.

FIG. 2 is a flow diagram showing a method of controlling voice message transmission in the system of FIG. 1 according to the present invention.

FIG. 3 is a simplified schematic block diagram of a pair of networked telephonic voice message systems in which voice message transmission is controllable according to the method of the present invention.

FIG. 4 is a flow diagram showing a method of controlling voice message transmission in the system of FIG. 3 according to the present invention.

DETAILED DESCRIPTION OF PREFERRED EMBODIMENTS

FIG. 1 represents a generally conventional telephonic voice message apparatus or system 10 that controls transmission, delivery, and storage of voice messages, which are sometimes referred to as Voice Mail messages. Telephonic voice message system 10 may be of the type manufactured and sold by any of a large number of manufacturers that include VMI, Comverse, Centigram, Rolm, Northern, or Boston Technology. Exemplary models of voice message system 10 may include the INFINITY 2 manufactured by Comverse Technology Inc. of Woodbury, N.Y. and the ONE-VIEW manufactured by Centigram Communications of San Jose, Calif.

Voice message system 10 may be telephonically accessed by multiple system users, each of which has an assigned message address or "mailbox," as well as system visitors who do not have assigned message addresses on voice message system 10. For reference purposes, voice message system 10 is shown connected to telephones 12 and 14 by which, respectively, a message sender (user A) and a message recipient (user B) access voice message system 10. It will be appreciated that telephones 12 and 14 may be located anywhere and can access voice message system through any switching or transmission systems, including a private branch exchange (PBX), local public switched telephone network (PSTN), or long distance or international telephone lines or channels. Telephones 12 and 14 require only basic capabilities (e.g., a DTMF keypad) to be operable with voice message system 10.

For purposes of clarity, message senders and recipients having assigned voice message addresses on voice message system 10 are referred to herein as system users. Voice message system 10 is also capable of receiving voice messages from others, who are referred to herein as system visitors. The following description is directed mainly to communication between system users A and B, but is similarly applicable to communication between a system visitor and either of system users A and B.

In conventional operation of voice message system 10, user A sends user B a voice message by telephoning voice message system 10 from telephone 12 and speaking into it to create a voice message or voice message data. Voice message system 10 automatically digitizes the voice message for storage User A directs the voice message to its destination (e.g., user B) and adds any conventional sender delivery commands for voice message system 10 (e.g., message delivery priority) by keying the destination message address and sender delivery command codes on the DTMF keypad of telephone 12. Alternatively, voice message system 10 includes a voice recognition subsystem that allows the sender to enter the destination address and any sender delivery commands merely by stating them.

Voice message system 10 associates the digitized voice message data with the destination message address and sender delivery commands and stores them for retrieval by the recipient (user B). Typically, voice message system 10 delivers to telephone 14 an indication that a message is available for retrieval by user B. Alternatively, user B may call voice message system 10 to check, for any voice messages. In generally this manner, a system user A on virtually any voice mail system is able to send a voice message to another system user B.

In accordance with the present invention, users A and B, as well as any others of the many system users, can control the transmission of voice messages or information directed to their message addresses by selecting preprogrammed voice message transmission instructions that are stored on voice message system 10. With increasing numbers of telephonic voice messages and voice message system users, voice message transmission instructions selectable by the recipient can prevent voice message system 10 from becoming inconvenient or burdensome to use.

FIG. 2 is a flow diagram showing a preferred method 20 of controlling transmission of voice message data according to the present invention. Voice message transmission control method 20 is described with reference to communication between systems users A and B, but is similarly applicable to communication from a system visitor to a system user.

Process block 22 represents that user A makes telephone contact with voice message system 10. The telephone contact with voice message system 10 may be specifically initiated by user A, or user A may be automatically transferred to voice message system 10 as a result of attempting to make a direct telephonic call to user B.

Process block 26 represents that user A speaks into a telephone to create or originate for user B a voice message from which voice message system 10 generates and stores voice message data or information. Voice message system 10 also acquires and stores the message address for user B and any sender delivery commands selected by user A. As is known in the art, the message address for user B may be keyed into a DTMF telephone keypad by user A or may have been previously acquired by voice message system 10. Alternatively, voice message system 10 includes a voice recognition subsystem that allows the sender to enter the destination address and any sender delivery commands merely by stating them.

Inquiry block 28 represents an inquiry whether the destination message address is a valid address on voice message system 10 and whether there is a specified voice message transmission instruction previously selected by user B for controlling voice messages directed to the destination message address. This inquiry takes place in response to the entry by user A of a destination message address or any sender delivery commands that are stored for delivery to the destination voice message address of user B. For example, voice message system 10 confirms whether the destination message address is a valid address and reviews a stored first listing of destination message addressees that have specified voice message transmission instructions.

If the destination message address is valid and has a specified voice message transmission instruction, inquiry block 28 proceeds to process block 30. If the destination message address is valid and does not have a specified voice message transmission instruction, inquiry block 28 proceeds to process block 34. If the destination message address is not valid, an invalid address message is delivered to user A.

Process block 30 represents that voice message system 10 accesses the specified voice message transmission instructions for the destination message address from a stored listing of destination message addresses and associated specified voice message transmission instructions. It will be appreciated that voice message system 10 is analogous to a computer by being programmable and having large information storage capacity. Storing the listings and programming voice message system 10 to create, review and access the listings is within the capabilities of persons skilled in the art.

The selectable voice message transmission instructions can include, for example, transmitting the telephonic voice message data to an alternate or additional voice message destination having a voice message address different from the destination voice message address, determining whether the origination address is included in a list of at least one acceptable origin address and transmitting the voice message to the destination only if the origination address is included in the preselected set, or determining whether the origination address is included in a list of at least one unacceptable origin address and blocking transmission of the voice message to the destination address whenever the origination address is included in the list.

The selectable voice message transmission instructions also can include assigning voice messages from a specified origination address with a priority (e.g., high or low) that determines the sequence in which messages are retrieved by the recipient, or designating voice messages from a specified origination address as being private so the messages cannot be copied or forwarded. If voice message system 10 includes a voice recognition and conversion subsystem, the selectable voice message transmission instructions can include converting voice messages to text data suitable for delivery as electronic mail to a selected electronic mailbox. The selectable voice message transmission instructions can further include converting the text data to a facsimile document suitable for delivery to a facsimile device.

User B selects voice message transmission instructions by keying corresponding command or selection codes on the DTMF keypad of telephone 14 in response to interactive voice prompts from voice message system 10. Alternatively, voice message system 10 includes a voice recognition subsystem that allows user B to select voice message transmission instructions merely by stating the corresponding command or selection codes. As another alternative, user B can select voice message transmission instructions by entering corresponding command or selection codes into voice message system 10 with a personal computer in communication with system 10.

Process block 32 represents that voice message system 10 processes the voice message data in accordance with any specified voice message transmission instruction.

Process block 34 represents that voice message system 10 directs the voice message data to the destination message address as a conventional voice message, stores it for retrieval by the recipient (user B), and provides an indication at telephone 14 that a voice message is available for retrieval. It will be appreciated that the internal operation of voice message systems from different manufacturers will vary. For example, directing voice message data to the destination message address may or may not include shifting or transmitting voice message data. With regard to the present invention, the signal processing details by which a particular voice message system makes a voice message available for retrieval are not material.

Process block 36 represents that method 20 is completed.

Voice message transmission control method 20 has been described with reference to a single otherwise conventional voice message system 10. The voice message transmission control method of the present invention is also applicable to a network of at least two separate voice message systems. With the increased numbers of users and potential voice messages on such a network, recipient control over voice messages becomes particularly desirable.

FIG. 3 shows a telephonic voice message apparatus 40 having a pair of generally conventional telephonic voice message systems 50 and 52 that are operable independently and communicate with each other through a voice message system network 54. Telephonic voice message systems 50 and 52 are preferably similar to voice message system 10.

Voice message systems 50 and 52 may be telephonically accessed by multiple system users of either system, each system user having an assigned message address or "mailbox," as well as system visitors who do not have message addresses on voice message system 50 or 52. For reference purposes, voice message systems 50 and 52 are shown connected to telephones 56 and 58 by which a message sender (user X) and a message recipient (user Y) access voice message systems 50 and 52, respectively. Telephones 56 and 58 provide substantially the same access to respective voice message systems 50 and 52 that telephones 12 and 14 provide to voice message system 10.

Voice message system network 54 includes network interface nodes or devices 60 and 62 through which voice message systems 50 and 52 access each other, as well as other voice message systems connected to network 54 but not shown. Network interface devices 60 and 62 may be, for example, an APOGEE WORLDGATE manufactured by the assignee of this application. Voice message system 50 and network interface device 60 compose a first voice message network subsystem 61, and voice message system 52 and network interface device 62 compose a second voice message network subsystem 63. Network interface devices 60 and 62 are operable independently of and may each serve one or more voice message systems. Network interface devices 60 and 62 are interconnected by at least one telecommunication channel 64, which is preferably a high capacity digital telecommunication channel over which large volumes of voice message data can be transmitted efficiently.

Due to the independent operability of voice message systems 50 and 52, the method by which a recipient controls voice messages directed to him preferably differs from voice message transmission control method 20. FIG. 4 is a flow diagram showing a preferred method 70 of controlling transmission of voice message data between independently operable voice message systems 50 and 52 in accordance with the present invention. Voice message transmission control method 70 is described with reference to communication between system users X and Y, but is similarly applicable to communication between a system user and a system visitor.

Process block 72 represents that user X makes telephone contact with voice message system 50. The telephone contact with voice message system 50 would typically be specifically initiated by user X. If user X attempts to make a direct telephonic call to user Y and is redirected to a voice message system, user X typically would be transferred to voice message system 52 with which user Y is associated. A voice message left by user X directly on voice message system 52 would preferably be processed by voice message transmission control method 20.

Process block 76 represents that user X speaks into telephone 56 to create or originate for user Y a voice message from which voice message system 50 generates and stores voice message data or information. Voice message system 50 also acquires and stores the message address for user Y and any sender delivery instructions selected by user X. As is known in the art, the destination message address may be keyed into a DTMF telephone keypad by user X or may have been previously acquired by voice message system 50. Alternatively, voice message system 50 includes a voice recognition subsystem that allows user X to enter the destination address and any sender delivery commands merely by stating them. Since the destination message address does not reside on voice message system 50, user X would typically have to enter an expanded destination message address that includes an indication that it resides on voice message system 52.

Process block 78 represents that expanded destination message address of recipient's (user Y's) telephone 58 is transmitted from voice message system 50 to associated network interface device 60.

Inquiry block 80 represents an inquiry whether the destination message address is a valid address on voice message system 52 and whether there is a specified voice message transmission instruction previously selected by user Y for controlling voice messages directed to the destination message address. In a first preferred embodiment, voice message system 50 transmits the expanded destination message address to associated network interface device 60, which forwards the destination message address over channel 64 to network interface device 62 associated with voice message system 52. Network interface device 62 confirms whether the destination message address is a valid address of voice message system 52 and reviews a stored first listing of destination message addressees that have specified voice message transmission instructions. In this embodiment, information regarding valid addresses of voice message system 52 and their associated voice message transmission instructions are periodically transferred from system 52 to network interface device 62.

In a second preferred embodiment, the expanded destination message address is transmitted to voice message system 52 via network interface device 60, channel 64, and network interface device 62. In response to a query from network interface device 62, voice message system 52 confirms whether the destination message address is a valid address and reviews a stored first listing of destination message addressees that have specified voice message transmission instructions.

If the destination message address is valid and has a specified voice message transmission instruction, inquiry block 80 proceeds to process block 82. If the destination message address is valid and does not have a specified voice message transmission instruction, inquiry block 80 proceeds to process block 88. If the destination message address is not valid, an invalid address message is provided to user X by way of the sender's voice message address.

Process block 82 represents that the specified voice message transmission instructions for the destination message address are accessed from a stored listing of destination message addresses and associated specified voice message transmission instructions. In the first and second preferred embodiments, the instructions are accessed by network interface device 62 and voice message system 52, respectively.

It will be appreciated that voice message systems 50 and 52 and network interface devices 60 and 62 are analogous to computers by being programmable and having large information storage capacity. Storing the listings on and programming voice message system 52 or network interface devices 62 to create, review and access the listings is within the capabilities of persons skilled in the art. The voice message transmission instructions and manner of selecting them can include those described above with reference to voice message system 10. Alternatively, network 54 could provide operator assistance services by which user Y could select voice message transmission instructions by calling and informing a network operator of the instructions the user has selected.

Process block 84 represents that a signal carrying the voice message transmission instructions is transmitted to network interface device 60 via network interface device 62 and channel 64. Thus, a message recipient (user Y) can block or reroute selected messages before there is an attempt to transmit them to the recipient as designated by the message originator (user X).

Process block 86 represents that voice message system 50 transmits the voice message data to network interface device 60, which processes the voice message data in accordance with any specified voice message transmission instruction. Thus, because of the noncontemporaneous nature of voice message communication, the message originator and recipient are not in communication during the processing of voice message transmission instructions established by the recipient.

Process block 88 represents that voice message system 50 directs the voice message data to the destination message address on voice message system 52 via network 54. Voice message system 52 stores the voice message data for retrieval by the recipient (user Y) and provides an indication at telephone 58 that a voice message is available for retrieval.

Process block 90 represents that method 70 is completed.

To control costs and message retrieval time, large entities using voice messaging need to regulate the originators of incoming voice messages and restrict the number of them. Significant costs include delivery system transient memory storage capacity, local access charges (e.g., 800 number or Bell Operating Company access charges), potential loss of opportunity (e.g., recipient is in different place and time from place and time of message transmission), and message transmission costs. The following example demonstrates the capability of the invention to achieve significant cost savings by allowing a recipient to block or re-route selected messages before they are transmitted to the recipient as designated by the message originator. For purposes of illustration only, the example is described with reference to the FIG. 3 embodiment.

EXAMPLE

User X wants to leave a message for uses Y. User X specifies certain delivery instructions such as routine delivery scheduling and nonconfidential message, but user Y has specified for messages addressed to him different message delivery instructions that include location re-routing, priority delivery, private message, encrypted message, and delivery certification. Processing of the message by user X proceeds as follows.

User X records a message on voice message system 50 and, upon completing his message, proceeds to other, unrelated activities. voice message system 50 communicates with network interface device 60 to indicate the presence of the message user X left and gives delivery instructions including the delivery address, length, and urgency of the message. Network interface device 60 communicates the delivery instruction information across telecommunication channel 64 to network interface device 62, which in turn communicates with voice message system 52 to validate the delivery address and check for any alternative delivery instructions placed by user Y in either network interface device 62 or voice message system 52.

Voice message system 52 provides back to network interface device 62 the alternative instructions specified by user Y and a confirmation of a valid delivery address. The alternative instructions and confirmation are then transmitted across telecommunication channel 64 to network interface device 60 to substitute the message delivery instructions of user Y for those of user X. Because user Y specified that messages addressed to him be re-routed, a significant cost saving is achieved as a consequence of the nontransmission of the message of user X to the original delivery address of user Y.

The processing of message setup instructions is analogous to that for real-time telephone call setup instructions, and in both cases the cost is relatively low. Neither user X nor user Y incurs a cost above that of normal network overhead; therefore, the transmission of voice message transmission instructions achieves the savings objective for user Y.

In response to the change in message instructions, network interface device 60 can reroute the message in accordance with the alternative instructions, which at a minimal cost change the delivery address, priority, confidentiality, encryption, and certification to those specified by user Y. For, example, if user Y specifies an address on the same system as that of the address of user X, the only cost incurred to deliver the message would be the local access charge to point the message to the delivery address commanded by user Y.

This example demonstrates that no message originator or recipient is on line during message management processing of a previously recorded message, which processing is based on functions a message nonoriginator has defined. This example also shows the invention can be implemented in a local system, local area network (LAN), and wide area network (WAN) environment. Skilled persons will appreciate that the message management functions carried out by way of example with reference to the FIG. 3 system can be distributed to other system components, such as those of the system of FIG. 1.

Skilled workers will recognize that the above-described voice message transmission example would also be applicable to other types of non-contemporaneous message transmission such as those found in facsimile document store and forward services and electronic mail, and that the communications medium employed need not be a telecommunications channel.

Skilled workers will further recognize that many changes may be made to the details of the above-described embodiment of this invention without departing from the underlying principles thereof. For example, voice message transmission control method 70 is described with reference to separate network interface devices 60 and 62 for respective voice message systems 50 and 52. As an alternative embodiment, voice message transmission control method 70 could operate with voice message systems 50 and 52 and only a single network interface device in direct communication with both message systems. The scope of the present invention should be determined, therefore, only by the following claims.

What is claimed is:

1. A method for controlling a message in a message system, the method comprising the steps of:
   acquiring and storing a message from a sender;
   acquiring and storing a destination address;
   acquiring and storing a sender delivery command; and
   processing the message according to a recipient instruction and the sender delivery command, the recipient instruction taking priority over the sender delivery command, the recipient instruction corresponding to the destination address and an identity of the sender, wherein the recipient instruction includes an instruction that controls a transmission of the message from an origination address of the sender of the message.

2. The method of claim 1, wherein the recipient instruction to transmit comprises an instruction to the transmit the message in a message format.

3. The method of claim 2, wherein the message format comprises an electronic mail format.

4. The method of claim 2, wherein the message format comprises a facsimile format.

5. The method of claim 1, wherein the step of acquiring and storing a message from a sender comprises the steps of:
   digitizing a voice message spoken by the sender; and
   storing the message, the message including the digitized voice message.

6. The method of claim 1, wherein the recipient instruction to transmit comprises an instruction to transmit the message to an alternate destination.

7. The method of claim 1, wherein the recipient instruction to transmit comprises an instruction to encrypt the message prior to transmitting.

8. The method of claim 1, wherein the recipient instruction to transmit comprises an instruction to mark the message private prior to transmitting.

9. The method of claim 1, wherein the recipient instruction to transmit comprises an instruction to certify delivery of the message.

10. The method of claim 1, wherein the sender delivery command is selected from a plurality of delivery commands.

11. The method of claim 10, wherein the plurality of delivery commands comprises:
   transmit to alternate destination;
   transmit to additional destination;
   assign priority to the message;
   mark the message private;
   prevent the message from being copied;
   prevent the message from being forwarded;
   encrypt the message;
   certify delivery of the message;
   convert the message to an email format; and
   convert the message to a facsimile format.

12. A method for selectively transmitting a message between a first and a second message network subsystem, each message network subsystems having a message system and a network interface device, the method comprising the steps of:
   the first message network subsystem acquiring a message from a sending user having an origination address;
   the first message network subsystem digitizing and storing the message;
   the first message network subsystem acquiring a destination address from the sending user, the destination address corresponding to the message;
   the first message network subsystem storing the destination address;
   the first message network subsystem acquiring a sending instruction from the sending user;
   the first message network subsystem storing the sending instruction;
   the first message network subsystem transmitting the destination address to the second network subsystem;
   the first message network subsystem receiving a transmit instruction from the second network subsystem, the transmit instruction corresponding to the destination address and the origination address, the transmit instruction including an instruction to convert the message into a message type or to block transmission of the message from the origination address; and
   the first message network subsystem processing the message according to the transmit instruction and the sending instruction, the transmit instruction taking precedence over the sending instruction.

13. The method of claim 12, wherein the transmit instruction to convert the message into a message type comprises an instruction to convert the message into an electronic mail format.

14. The method of claim 12, wherein the transmit instruction to convert the message into a message type comprises an instruction to transmit the message to an alternate destination address.

15. The method of claim 12, wherein the transmit instruction to convert the message into a message type comprises an instruction to mark the message private.

16. The method of claim 12, wherein the transmit instruction to convert the message into a message type comprises an instruction to certify delivery of the message.

17. The method of claim 12, wherein the transmit instruction to convert the message into a message type comprises an instruction to convert the message into a facsimile format.

18. The method of claim 12, wherein the step of the first message subsystem acquiring and storing a sending instruction comprises acquiring and storing a sending instruction selected from a plurality of sending instructions.

19. The method of claim 18, wherein the plurality of sending instructions comprises:
   transmit message to destination;
   transmit message to alternate destination;
   transmit to additional destination;
   assign priority to the message;
   mark the message private;
   encrypt the message;
   certify delivery of the message;
   prevent the message from being copies;
   prevent the message from being forwarded;
   convert the message to an email format; and
   convert the message to a facsimile format.

20. The method of claim 12, wherein the step of the first message network subsystem receiving a transmit instruction from the second network subsystem comprises the step of the first network interface device receiving the transmit instruction from the second network interface device, and storing the transmit instruction in the first message system.

21. A method for selectively transmitting a message between a first and a second message network subsystem, each message network subsystems having a message system and a network interface device, the method comprising the steps of:
   the second message network subsystem acquiring and storing a transmit instruction from a recipient having a recipient address, the transmit instruction corresponding to a sender, the transmit instruction including an instruction either to transmit the message from an origination address of the sender in an electronic mail format or to block transmission of the message from the origination address;
   the second message network subsystem receiving the destination address from the first message network subsystem;
   the second message network subsystem determining if the destination address corresponds to the recipient address;
   the second message network subsystem retrieving the transmit instruction; and
   the second message network subsystem transmitting the transmit instruction to the first message network subsystem.

22. The method of claim 21, wherein the transmit instruction to transmit the message from the origination address of the sender in an electronic mail format further comprises an instruction to transmit the message to an alternate destination address.

23. The method of claim 21, wherein the transmit instruction to transmit the message from the origination address of the sender in an electronic mail format further comprises an instruction to assign a priority to the message.

24. The method of claim 21, wherein the transmit instruction to transmit the message from the origination address of the sender in an electronic mail format further comprises an instruction to encrypt the message.

25. The method of claim 21, wherein the transmit instruction to transmit the message in an electronic mail format further comprises an instruction to mark the message as private.

26. The method of claim 21, wherein the step of the second message network subsystem determining if the destination address corresponds to the recipient address comprises the step of:

the second network interface device determining if the destination address corresponds to the recipient address.

27. The method of claim 26, wherein the step of the second message network subsystem acquiring and storing a transmit instruction from a recipient having a recipient address comprises the steps of:

the second message system acquiring and storing the transmit instruction from a recipient; and the second message system periodically transferring the recipient address and the transmit instruction to the second network interface device.

* * * * *

(12) INTER PARTES REEXAMINATION CERTIFICATE (1018th)
United States Patent
Finnigan

(10) Number: US 7,221,745 C1
(45) Certificate Issued: Dec. 24, 2014

(54) TELEPHONIC VOICE MESSAGE TRANSMISSION CONTROL METHOD

(75) Inventor: Paul F. Finnigan, Los Gatos, CA (US)

(73) Assignee: Eidos Communications, LLC, Washington, DC (US)

Reexamination Request:
No. 95/001,895, Feb. 16, 2012

Reexamination Certificate for:
Patent No.: 7,221,745
Issued: May 22, 2007
Appl. No.: 10/868,819
Filed: Jun. 17, 2004

Related U.S. Application Data

(60) Continuation of application No. 10/656,162, filed on Sep. 8, 2003, now Pat. No. 7,221,744, which is a continuation of application No. 09/756,693, filed on Jan. 9, 2001, now Pat. No. 6,697,459, which is a division of application No. 08/817,443, filed on Aug. 22, 1997, now Pat. No. 6,173,043, which is a continuation-in-part of application No. 08/684,318, filed on Jul. 18, 1996, now Pat. No. 5,687,220, which is a continuation of application No. 08/332,102, filed on Oct. 31, 1994, now abandoned.

(30) Foreign Application Priority Data

Oct. 31, 1995 (WO) ................. PCT/US95/14204

(51) Int. Cl.
*H04M 1/64* (2006.01)

(52) U.S. Cl.
USPC .................. 379/88.23; 379/88.18; 379/211.02

(58) Field of Classification Search
None
See application file for complete search history.

(56) References Cited

To view the complete listing of prior art documents cited during the proceeding for Reexamination Control Number 95/001,895, please refer to the USPTO's public Patent Application Information Retrieval (PAIR) system under the Display References tab.

*Primary Examiner* — Minh Dieu Nguyen

(57) ABSTRACT

The present invention is directed to a method of controlling transmission of voice messages or information via telephonic voice message systems, which are sometimes referred to as Voice Mail Systems. Users of the system selectively specify voice message transmission instructions for controlling transmission of voice messages directed to them. Upon receipt of a user's voice message address, the voice message system determines whether the destination voice message address has a specified voice message transmission instruction previously selected by the recipient and processes the voice message in accordance with the instruction.

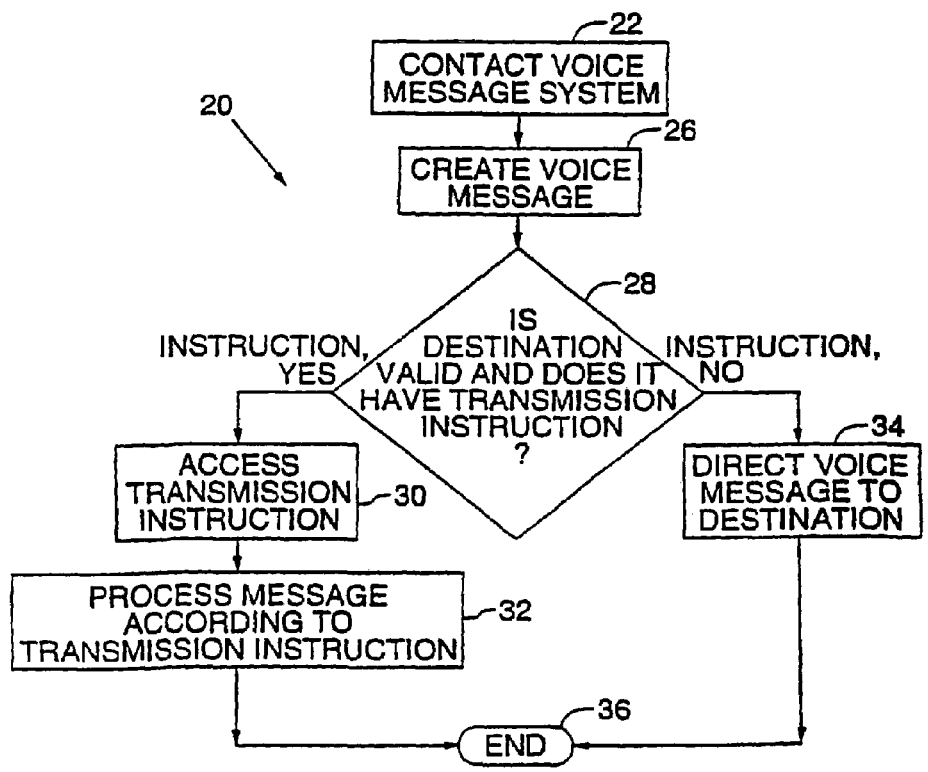

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-3, 6 and 10 are cancelled.
Claims 4-5, 7-9 and 11-27 were not reexamined.

\* \* \* \* \*